United States Patent
Hammerschmidt

(10) Patent No.: US 11,408,977 B2
(45) Date of Patent: Aug. 9, 2022

(54) POSITION SENSOR AND POSITION MEASUREMENTS USING MILLIMETER-WAVE METAMATERIAL

(71) Applicant: Infineon Technologies AG, Neubiberg (DE)

(72) Inventor: Dirk Hammerschmidt, Finkenstein (AT)

(73) Assignee: Infineon Technologies AG

( * ) Notice: Subject to any disclaimer, the term of this patent is extended or adjusted under 35 U.S.C. 154(b) by 502 days.

(21) Appl. No.: 16/524,543

(22) Filed: Jul. 29, 2019

(65) Prior Publication Data
US 2021/0033703 A1 Feb. 4, 2021

(51) Int. Cl.
| | | |
|---|---|---|
| *G01S 7/41* | (2006.01) | |
| *H01Q 15/14* | (2006.01) | |
| *G01S 13/06* | (2006.01) | |
| *G01D 5/48* | (2006.01) | |

(52) U.S. Cl.
CPC .............. *G01S 7/411* (2013.01); *G01S 13/06* (2013.01); *H01Q 15/14* (2013.01); *G01D 5/48* (2013.01)

(58) Field of Classification Search
CPC ........ G01S 7/032; G01S 13/931; G01S 7/411; G01S 2013/9318; G01S 2013/93185; B60W 30/09; B60W 10/18; B60W 10/20; B60W 10/184; B60W 2420/52; H01Q 21/061; H01Q 23/00; H01Q 15/0086; H01Q 15/14; H01Q 21/06; H01Q 1/422; H01Q 9/04; H01Q 19/10; H01Q 21/00
See application file for complete search history.

(56) References Cited

U.S. PATENT DOCUMENTS

| | | | | |
|---|---|---|---|---|
| 10,399,393 | B1 * | 9/2019 | Trotta | ................. B60C 23/0461 |
| 10,581,175 | B2 * | 3/2020 | Driscoll | ................ G01S 7/4811 |

(Continued)

OTHER PUBLICATIONS

Metamaterial Technologies Inc., "Metamaterials", [online]. [Retrieved from the internet May 7, 2019] URL: <http://www.metamaterial.com/metamaterials/>.

(Continued)

*Primary Examiner* — Olumide Ajibade Akonai
(74) *Attorney, Agent, or Firm* — Design IP

(57) ABSTRACT

A rotation sensor system includes a rotatable target object configured to rotate about a rotational axis in a rotation direction; a first millimeter-wave (mm-wave) metamaterial track coupled to the rotatable target object, where the first mm-wave metamaterial track is arranged around the rotational axis, and where the first mm-wave metamaterial track includes a first array of elementary structures having at least one first characteristic that changes around a perimeter of the first mm-wave metamaterial track; at least one transmitter configured to transmit a first electro-magnetic transmit signal towards the first mm-wave metamaterial track, where the first mm-wave metamaterial track converts the first electro-magnetic transmit signal into a first electro-magnetic receive signal; at least one receiver configured to receive the first electro-magnetic receive signal; and at least one processor configured to determine a rotational position of the rotatable target object based on the received first electro-magnetic receive signal.

35 Claims, 15 Drawing Sheets

(56) References Cited

U.S. PATENT DOCUMENTS

| | | | |
|---|---|---|---|
| 2002/0189336 A1* | 12/2002 | McEwan | G01M 17/027 |
| | | | 73/146 |
| 2011/0175672 A1* | 7/2011 | Nguyen | H01Q 15/0086 |
| | | | 327/534 |
| 2017/0222738 A1 | 8/2017 | Hammerschmidt et al. | |
| 2017/0285163 A1* | 10/2017 | Rieke | H01Q 1/3233 |
| 2020/0350662 A1* | 11/2020 | Holz | H01Q 1/273 |

OTHER PUBLICATIONS

HELLA Electronics, "Position Sensors (CIPOS)". [online], [Retrieved from the internet May 2, 2019] URL: <https://www.hella.com/microsite-electronics/de/Positionssensoren-148.html>.

* cited by examiner

POSITION SENSOR AND POSITION MEASUREMENTS USING MILLIMETER-WAVE METAMATERIAL

FIELD

The present disclosure relates generally to a position sensing system and to methods for sensing a position, including angular or linear positions, of a target object.

BACKGROUND

Vehicles feature numerous safety, body, and powertrain applications that rely on speed sensing, position sensing, and/or angle sensing. For example, in a vehicle's Electronic Stability Program (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions. However, a disadvantage of known solutions is that they are sensitive to magnetic disturbances.

Magnetic disturbance fields are prevalent in vehicles such that magnetic angle-measurements often have to endure harsh environments. This is especially problematic in hybrid and electric vehicles, where many wires with high currents are located near the sensor system. Thus, external magnetic disturbance fields may be generated by current-rails in a vehicle that influence the accuracy of the magnetic angle measurements. Thus, an angle position sensor or a linear position sensor that is robust against electromagnetic stray fields may be desirable.

SUMMARY

One or more embodiments provide a rotation sensor system including a rotatable target object configured to rotate about a rotational axis in a rotation direction; a first millimeter-wave (mm-wave) metamaterial track coupled to the rotatable target object, where the first mm-wave metamaterial track is arranged around the rotational axis, and where the first mm-wave metamaterial track includes a first array of elementary structures having at least one first characteristic that changes around a perimeter of the first mm-wave metamaterial track; at least one transmitter configured to transmit a first electro-magnetic transmit signal towards the first mm-wave metamaterial track, where the first mm-wave metamaterial track converts the first electro-magnetic transmit signal into a first electro-magnetic receive signal; at least one receiver configured to receive the first electro-magnetic receive signal; and at least one processor configured to determine a rotational position of the rotatable target object based on the received first electro-magnetic receive signal.

One or more embodiments provide a method of determining a rotational position of a rotatable target object. The method includes transmitting a first electro-magnetic transmit signal towards a first millimeter-wave (mm-wave) metamaterial track coupled to the rotatable target object, wherein the first mm-wave metamaterial track is arranged around a rotational axis about which the rotatable target object rotates; converting, by the first mm-wave metamaterial track, the first electro-magnetic transmit signal into a first electro-magnetic receive signal; receiving the first electro-magnetic receive signal; evaluating the received first receive signal; and determining a rotational position of the rotatable target object based on the evaluated first electro-magnetic receive signal.

One or more embodiments provide a linear position sensor system including a linear movable target object configured to move linearly in a linear moving direction; a millimeter-wave (mm-wave) metamaterial track coupled to the linear movable target object, where the mm-wave metamaterial track extends along the linear moving direction, and where the mm-wave metamaterial track includes an array of elementary structures having at least one first characteristic that changes along the mm-wave metamaterial track in the linear moving direction; at least one transmitter configured to transmit an electro-magnetic transmit signal towards the mm-wave metamaterial track, where the mm-wave metamaterial track converts the electro-magnetic transmit signal into an electro-magnetic receive signal; at least one receiver configured to receive the electro-magnetic receive signal; and at least one processor configured to determine a linear position of the linear movable target object based on the received electro-magnetic signal.

BRIEF DESCRIPTION OF THE DRAWINGS

Embodiments are described herein making reference to the appended drawings.

DETAILED DESCRIPTION

Figure 1:
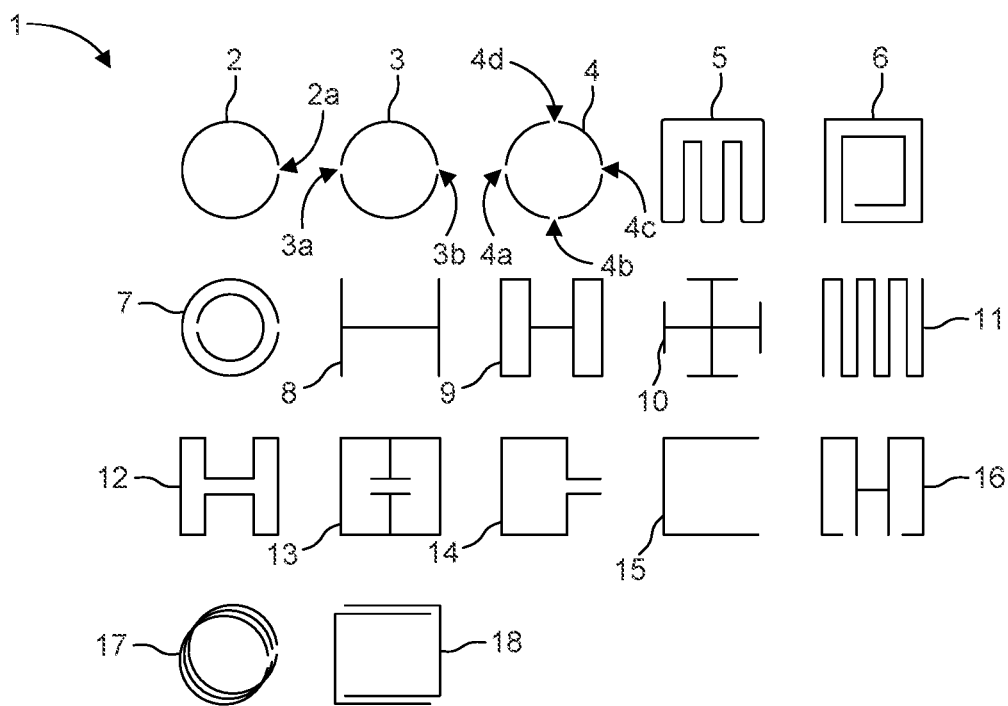
FIG. 1 illustrates a plurality of possible elementary structures according to one or more embodiments.

In the following, various embodiments will be described in detail referring to the attached drawings. These embodiments are given for illustrative purposes only and are not to be construed as limiting. For example, while embodiments may be described as comprising a plurality of features or elements, in other embodiments, some of these features or elements may be omitted, and/or may be replaced by alternative features or elements. In other embodiments, further features or elements in addition to those explicitly shown or described may be provided. In addition, features of the different embodiments described hereinafter may be combined with each other to form further embodiments, unless specifically noted otherwise. For example, variations or modifications described with respect to one of the embodiments may also be applicable to other embodiments unless noted to the contrary.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Embodiments relate to sensors and sensor systems, and to obtaining information about sensors and sensor systems. A sensor may refer to a component which converts a physical quantity to be measured to an electric signal, for example, a current signal or a voltage signal. In general, a physical quantity may for example comprise a magnetic field, an electric field, radio waves, a pressure, a force, a current or a voltage, but is not limited thereto. A sensor device, as described herein, may be an angle sensor, a linear position sensor, a speed sensor, a motion sensor, and the like.

The sensor circuit may be referred to as a signal processing circuit and/or a signal conditioning circuit that receives one or more signals (i.e., sensor signals) from one or more sensor elements in the form of raw measurement data and derives, from the sensor signal, a measurement signal that represents the physical quantity.

It will be appreciated that the terms "sensor", "sensor element", and "sensing element" may be used interchangeably throughout this description, and the terms "sensor signal" and "measurement signal" may also be used interchangeably throughout this description.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal. Therefore, the sensor package may include a circuit that conditions and amplifies the small signal of the sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1. The elementary structure size may range up to several wavelengths but is typically below one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1 illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 6B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1 further illustrates a stacked split ring resonator structure 17 having three split ring resonators stacked on top of each other. The stacked split ring resonator structure 17 may be formed by using three metallization layers stacked on top of each other. FIG. 1 further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures are arranged in arrays which typically have dimensions that are larger than a wavelength of the target frequency range and include a multitude of elementary structures in each utilized direction.

Figures 2A, 2B:
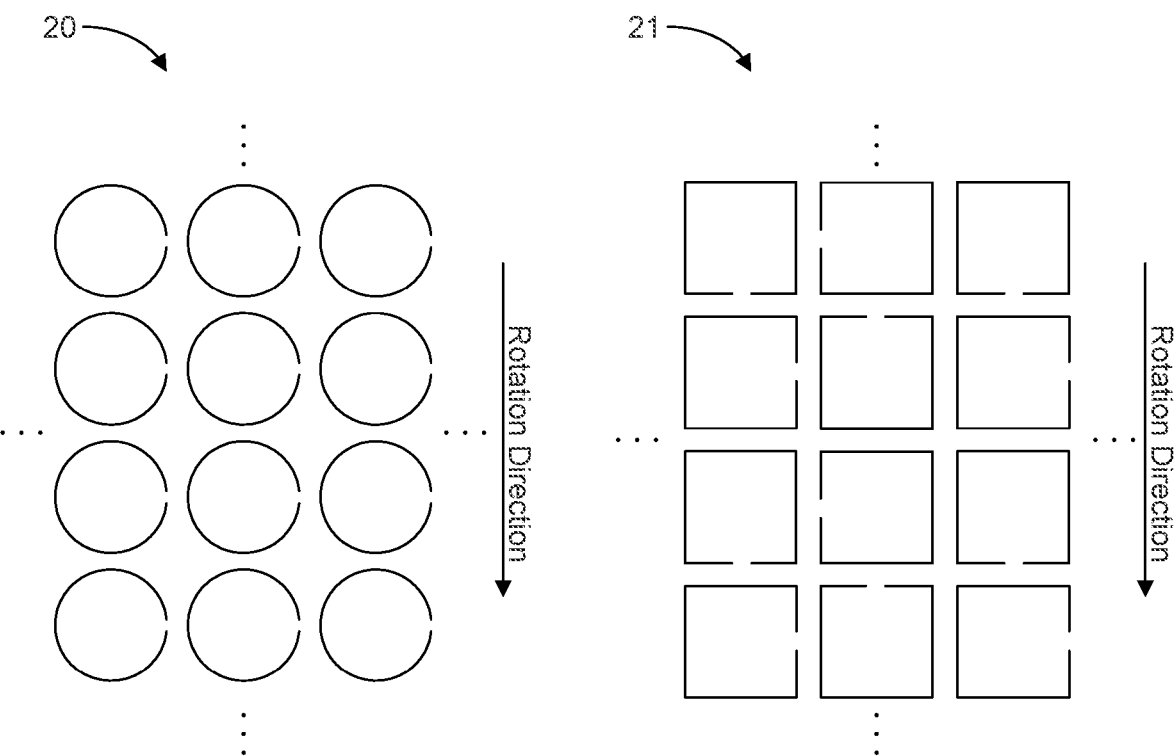
FIGS. 2A and 2B illustrate a segment of a mm-wave metamaterial track according to one or more embodiments.

FIGS. 2A and 2B illustrate a segment of a mm-wave metamaterial track according to one or more embodiments. A mm-wave metamaterial track is a stripe of mm-wave metamaterial that has multiple elementary structures arranged in both widthwise and lengthwise dimensions.

Specifically, FIG. 2A shows an example of a 2D array 20 of split ring resonators, which are expected to extend further in both horizontal and rotational (circumferential) directions. However, it will be appreciated that the split ring resonators may be exchanged with any type of elementary structure, for example, with any of those shown in FIG. 1. Each split ring resonator comprises an open ring that represents an inductivity (L) and a gap or opening that provides a capacitive coupling (C). Thus, each split ring resonator is a type of LC resonator.

There exists a mutual coupling of the structures in the array 20, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this change in coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 21 of split ring resonators an orientation of the split ring resonators changes in both the horizontal (width) and vertical (length) directions of the array 21 (i.e., of the metamaterial track). In other words, the location of the gap of each split ring resonator varies across neighboring structures. As a result, the coupling effect between structures is different than the coupling effect produced by the structures shown in FIG. 2A. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 20 may be a single metallization layer disposed or printed on a film such that the array 20 is two-dimensional. As noted above, it may also be possible to stack multiple metallization layers to form a 3D array.

Thus, arrays 20 and 21 include multiple repetitions of element structures having differing arrangements with respect to each other that induce a different property on a transmission wave or signal incident thereon due to the change in coupling effect between the structures.

As will become apparent in the following description, one or more mm-wave metamaterial tracks may be used to perform off-axis angle measurements pertaining to a rotatable target object or to perform linear position sensing pertaining to a linear movable target object.

Figure 3A:
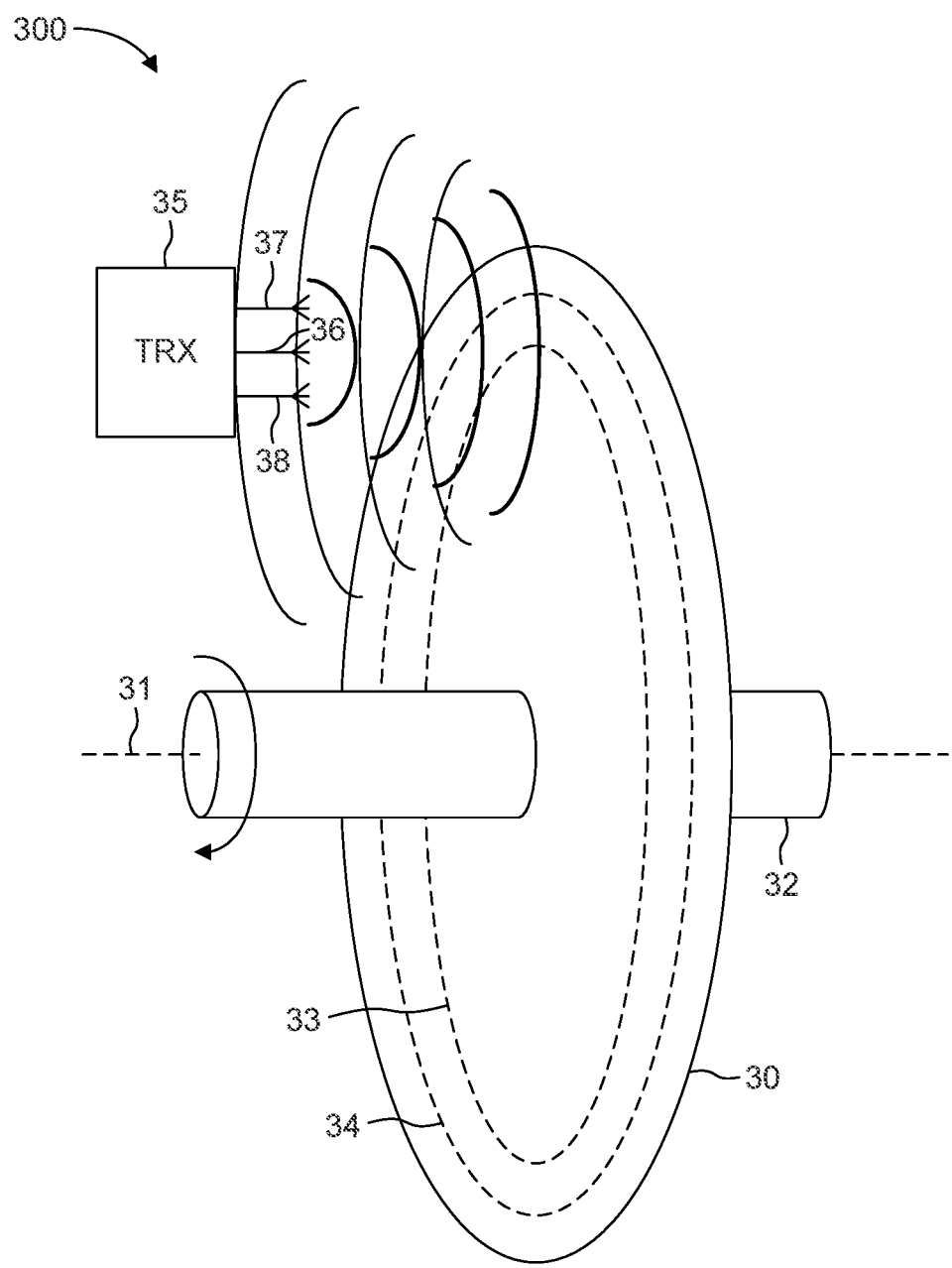
FIG. 3A is a schematic view of an angle sensor system according to one or more embodiments.

FIG. 3A is a schematic view of an angle sensor system 300 according to one or more embodiments. The angle sensor system 300 includes a rotatable target object 30 configured to rotate about an axis of rotation 31 (i.e., a rotational axis). The rotatable target object 30 may be a disc or a wheel coupled to a shaft 32 that extends along the rotational axis 31. As the shaft 32 rotates, so does the rotatable target object 30. The rotatable target object 30 represents a mechanical target for one or more mm-wave beams.

The rotatable target object 30 includes two mm-wave metamaterial tracks 33 and 34 that each form a closed loop around the shaft 32. In this example, the two mm-wave metamaterial tracks 33 and 34 are concentric loops located at different distances from the rotational axis. In some embodiments, it may be possible to use a single closed-loop metamaterial track or more than two closed-loop metamaterial tracks. The mm-wave metamaterial tracks 33 and 34 are fixed to the rotatable target object 30 such that they co-rotate with the rotatable target object 30 as it rotates.

It may also be possible to use tracks with different characteristic of the variations of the patterns, for example, implementing a sine function or a cosine function in the varying parameter of the metamaterial. Furthermore, reference tracks that do not change the characteristic of the meta material may be of interest to characterize the influence of environmental influences or setup parameters like the distance between the antenna and the meta material stripe or the temperature and humidity of the ambient environment. Multiple reference stripes with different metamaterial setups may be used to deliver different reference measurements. For example, different reference stripes may be used to provide for a minimum and a maximum of the variation of metamaterial properties.

The angle sensor system 300 further includes a transceiver TRX 35 configured to transmit and receive mm-waves. In particular, the transceiver 35 includes a transmitter antenna 36 configured to transmit a mm-wave beam (i.e., an electro-magnetic transmit signal) at the two metamaterial tracks 33 and 34. The transmitter antenna 36 may be further representative of multiple antennas or an antenna array. For example, in order to achieve a homogeneous radiation on each metamaterial track, multiple transmitter antennas or transmitter antenna arrays may be used such that each antenna or antenna array is focused on a different track. In this case, the transmitter antennas can be operated in parallel or by separate transmitters.

The transceiver 35 also includes two receiver antennas 37 and 38, each configured to receive a partially-reflected mm-wave (i.e., an electro-magnetic receive signal) from a corresponding metamaterial track of the two metamaterial tracks 33 and 34. In other words, the two receiver antennas 37 and 38 are isolated from each other in a way that receiver antenna 37 substantially receives a partially-reflected mm-wave only from one of the tracks (e.g., metamaterial track 34) and receiver antenna 38 substantially receives a reflected mm-wave only from the other one of the tracks (e.g., metamaterial track 33). Thus, isolations between the antennas or between the tracks, such as a metal stripe, may be provided.

While a small portion of a non-corresponding reflected mm-wave may be received at each antenna 37 and 38, this signal may be attenuated to the extent that the signal can be ignored or filtered out as noise by the transceiver 35.

In addition, it will be appreciated that the transceiver 35 may include two transmitter antennas instead of a single transmitter antenna, where each transmitter antenna is arranged to target a single metamaterial track. Thus, each mm-wave may be exclusively incident on a corresponding track. Alternatively, a transmitter antenna may target two or more tracks, where the mm-wave is exclusively incident on the corresponding tracks. Thus, different groups of tracks may be targeted by different transmitter antennas.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams where different receiving antenna and receiving circuitry correspond to different closed-loop metamaterial track on a one-to-one basis. The transmitters and receivers may be electrically coupled to a system controller and/or a DSP.

Figure 3B:
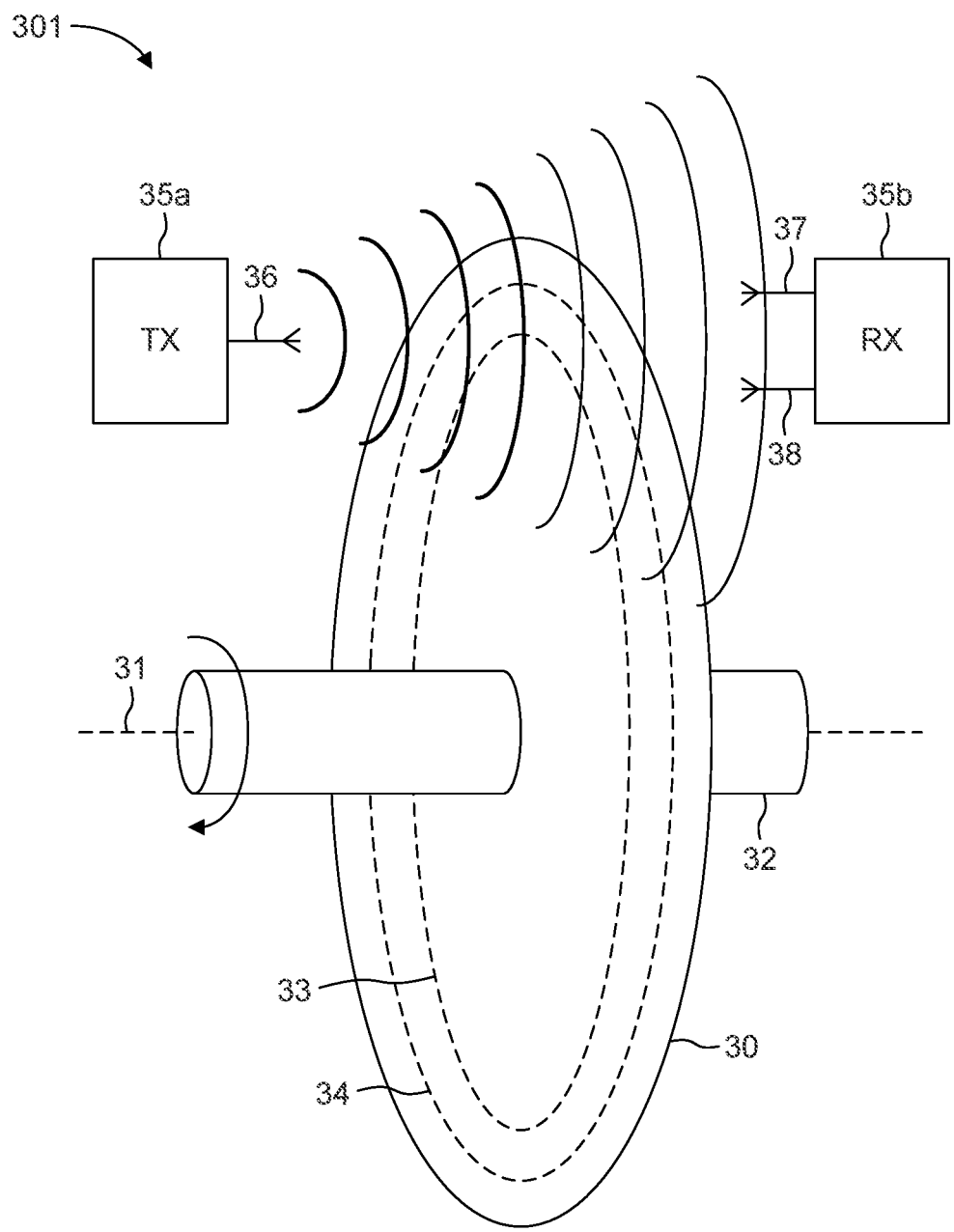
FIG. 3B is a schematic view of an angle sensor system according to one or more embodiments.

FIG. 3B is a schematic view of an angle sensor system 301 according to one or more embodiments. The angle sensor system 301 is similar to the angle sensor system 300 depicted in FIG. 3A, with the exception that the angle sensor system 301 is configured to monitor a mm-wave that passes through the two metamaterial tracks 33 and 34 instead of monitoring reflected mm-wave as was the case in FIG. 3A. As a result, angle sensor system 301 includes a transmitter 35*a*, including the transmitter antenna 36, and a receiver 35*b*, including the receiver antennas 37 and 38. The receiver antenna 37 is configured to receive a partially transmitted mm-wave (i.e., an electro-magnetic receive signal) as a result of the transmitted mm-wave interacting with (i.e., being partially absorbed by and transmitted through) the metamaterial track 34. Similarly, the receiver antenna 38 is configured to receive a partially transmitted mm-wave (i.e., an electro-magnetic receive signal) as a result of the transmitted mm-wave interacting with (i.e., being partially absorbed by and transmitted through) the metamaterial track 33.

It will also be appreciated that a combination of FIGS. 3A and 3B may be realized. For example, one receiver may be arranged for detecting and measuring a partially-reflected mm-wave from one of the metamaterial tracks (i.e., metamaterial track 34) and another receiver may be arranged for detecting and measuring a partially transmitted mm-wave that passes through the other one of the metamaterial tracks (i.e., metamaterial track 33). In addition, two receivers may be used for analyzing a same metamaterial track, where one detects and measures a partially-reflected mm-wave and the other detects and measures a partially-transmitted mm-wave. Accordingly, one metamaterial track may be configured with higher reflectivity and the other metamaterial track may be configured with a higher absorptivity with respect to one another.

Based on the embodiments shown in FIGS. 3A and 3B and combinations thereof, an electro-magnetic transmit signal is converted into an electro-magnetic receive signal by interacting with a metamaterial track. The interaction may include a reflection, an absorption, a transmission, or a combination thereof. Each receiver antenna is coupled to receiver circuitry configured to demodulate a receive signal in order to determine a characteristic of the receive signal. An absolute angular position of the rotatable target object 30 is then determined by the receiver circuit or a system controller utilizing a signal processor based on the determined characteristic.

In particular, each metamaterial track is configured such that a characteristic or property of the metamaterial changes along the perimeter of the track. Thus, how the metamaterial interacts with a mm-wave changes along the perimeter of the track. For example, the elementary structures of an array have a 360° periodical pattern that changes continuously around the circumference of the rotatable target and/or along the perimeter of the metamaterial track. Thus, the pattern continuously changes from 0° to 360° along the closed-loop of the metamaterial track, and then repeats.

A property and/or arrangement of the metamaterial is specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

For commutation of multi-pole electric motors with 3N poles, the electric angle being the sum of all poles has to be 360°. Thus, the periodical pattern of the elementary structures of an array for the mechanical angle may have a period of 360°/N, with N being an integer number. That is, the periodical pattern repeats every 360°/N. In this case, multiple predetermined (i.e., reference) angular positions of the rotatable target object may be known, and each absolute angular position has an absolute angular value from one of the reference angular positions. Each reference angular position is detectable based on the characteristic or property of the metamaterial at a specific position along the track.

The characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof.

A receiver circuit may receive and demodulate a receive signal, and evaluate an amplitude modulation and/or a phase modulation of the receive signal using amplitude analysis and/or phase analysis, respectively. For example, the receiver circuit may evaluate an amplitude variation or a phase shift of the receive signal. The receive circuit may then determine an absolute angular position of the metamaterial track and/or the rotatable target object based on the determined amplitude modulation or phase modulation. For example, the receiver circuit may refer to a look-up table provided in memory that stores angular positions relative to a specific amplitude modulation or phase modulation.

Thus, either the amplitude or the phase of the received signal is analyzed with respect to the same property of the transmitted signal. The metamaterial is a passive structure, it cannot the frequency of the signal. However, it can change its own resonance frequency or, better said, the locations of its poles and zeros, which can then influence the reflected or the transmitted signal and be detected in amplitude and phase or in real and imaginary part of the signal. Both combinations describe the possible influence completely.

Analyzing the shift of a resonance or a pole or a zero may also be characterized over the frequency with a frequency sweep of the transmit signal, but requires a more complex evaluation circuitry.

As an example for determining an absolute angular position or discrete angular value for a given metamaterial track, the transceiver 35 may transmit a continuous mm-wave as a carrier signal that has a constant frequency. Each metamaterial track receives the carrier signal and partially reflects or transmits the signal back at the transceiver 35. The transceiver 35 includes a receiver circuit that includes two demodulators (e.g., two mixers), each configured to demodulate a received signal from a corresponding metamaterial track. Alternatively, the receiver circuit may include a multiplexer coupled to single demodulator that demodulates both received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) can correspond to the absolute angular position of the corresponding metamaterial track.

In addition, a phase shift between two receive signals may be analyzed for determining an absolute angular position. For example, the rotated patterns of metamaterial tracks 33 and 34 may be the same but shifted 90° (e.g., clockwise or counterclockwise) from each other such that there is a 90° phase shift in the extracted signals resultant from the two metamaterial tracks after the evaluation of the metamaterial property. This means that two metamaterial tracks at the same corresponding angle of rotation would produce extracted signals that are 90° out of phase from each other. This essentially produces a sine measurement signal and a cosine measurement signal while the rotatable target object is rotating, that when compared to each other identifies a unique angular position.

Alternatively, two receiver antennas can be focused on the same metamaterial tracks, but spaced 90° apart. In other words, the placement of the two receiver antenna is such that the pattern of the metamaterial at those locations is shifted with respect to each other that results in a 90° phase shift in the extracted signals resultant at those two locations. Again, this essentially produces a sine wave measurement signal and a cosine wave measurement signal while the rotatable target object is rotating, that when compared to each other identifies a unique angular position.

Analyzing a receive signal from a single track may be used to determine the angular position (i.e., an angular value) of the rotatable target object. From this, the rotational speed may also be calculated by determining a rate of change in the angular values. Additionally, by obtaining two measurement signals (e.g., two 90° phase shifted signals), a rotation direction of the rotatable target object may also be determined.

For example, the rotation direction may be determined at each zero-crossing or at some other switching threshold of a first measurement signal (e.g., a sine measurement signal or a cosine measurement signal). For example, a DSP may determine whether the first measurement signal has a zero-crossing on a falling edge or on a rising edge, and may further analyze the correlation to a negative value or positive value of a second measurement signal (e.g., the other of the sine measurement signal and the cosine measurement signal).

For example, a negative value of the second measurement signal at a falling edge of the first measurement signal may indicate a first rotation direction. A positive value of the second measurement signal at a rising edge of the first measurement signal may also indicate the first rotation direction. A positive value of the second measurement signal at a falling edge of the first measurement signal may indicate a second rotation direction. A negative value of the second measurement signal at a rising edge of the first measurement signal may also indicate the second rotation direction. Since the second measurement signal is 90° phase shifted to the first measurement signal, the determination of rotation direction is less susceptible to error that may be cause by external stray fields, biasing noise, and other types of interference.

In addition or in the alternative, the DSP may evaluate the sign of the second measurement signal at each zero crossing of the first measurement signal. If the sign of the second measurement signal alternates between two successive zero crossings (+ − or − +), the rotation direction remains the same. However, if the sign of the second measurement signal between two successive zero crossings does not alternate, (+ + or − −) a direction change is detected by the DSP.

Alternatively, in cases where sine and cosine are available for the calculation of the angle, the rotation direction is self-evident depending on increase or decrease of the angle value without using a switching threshold.

The wide range of flavors that metamaterials offer with different structures, layers, and mutual coupling could be evaluated based on a complete measurement of the parameters using a frequency modulated signal over the range in which the spectral relevant effects of the metamaterial appear. However, the target applications will provide a low cost measurement compared to a traditional radar. Thus, the circuit effort may be minimized and the RX/TX setup will depend on the final metamaterial design.

Figure 3C:
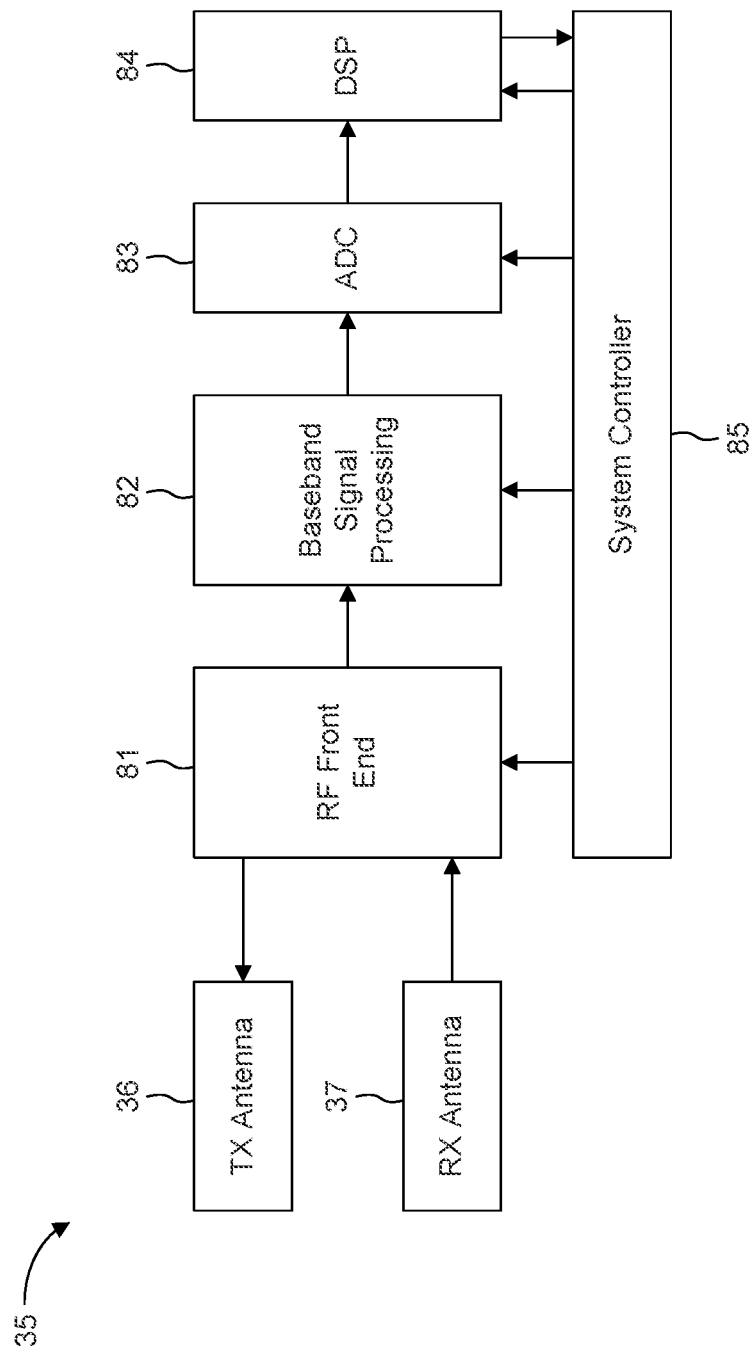
FIG. 3C is a block diagram that illustrates a transceiver circuit of a transceiver according to one or more embodiments.

FIG. 3C is a block diagram that illustrates structure of one example of a transceiver according to one or more embodiments. The transceiver 35 includes relevant transmission circuitry and receiver circuitry to the embodiments described herein. It will also be appreciated that relevant transmission circuitry and receiver circuitry may be divided between the transmitter 35a and receiver 35b according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 36 (TX antenna) and at least one receiver antenna 37 (RX antenna) and/or receiver antenna 38 are connected to an RF front end 81 integrated into a chip, which front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 81 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna 36 may be for example in the range of approximately 10 GHz to 500 GHz. However, the frequency bands that are applied here depend on the structures to be used for the generation of the metamaterial target. As mentioned, the RF signal received by the RX antenna 37 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 82). The analog signal processing circuitry 82 essentially comprises filtering and possibly amplifying the baseband signal. The baseband signal is finally digitized (see analog-to-digital converter 83) and processed further in the digital domain. The digital signal processing chain may be implemented at least partly in the form of software that is able to be executed on a processor, for example a microcontroller, a digital signal processor (DSP) 84, or another computer unit. The overall system is generally controlled by way of a system controller 85 that may likewise be implemented at least partly in the form of software that is able to be executed on a processor, such as for example a microcontroller. The RF front end 81 and the analog baseband signal processing chain 82 (optionally also the analog-to-digital converter 83) may be integrated together in a single MMIC (that is to say an RF semiconductor chip). As an alternative, the individual components may also be distributed over a plurality of integrated circuits.

The DSP 84 is configured to perform the aforementioned phase analysis, amplitude analysis, and/or frequency analysis to determine an absolute angular position of the metamaterial track and/or the rotatable target object based on the determined amplitude modulation and/or phase modulation. The phase modulation of a received signal may be a phase shift of the received signal with respect to a phase of the transmitted mm-wave. Similarly, the amplitude modulation of a received signal may be an amplitude shift of the received signal with respect to an amplitude of the transmitted mm-wave. The DSP 84 may be configured to determine a phase shift and/or an amplitude shift of a received signal and translate the shift into an absolute angular value. For example, the DSP 84 may refer to a look-up table provided in memory that stores angular positions or values relative to a specific amplitude modulation and/or phase modulation.

In addition, the DSP 84 may analyze a phase shift between two receive signals for determining an absolute angular position as described herein. The DSP 84 may also calculate the rotational speed by analyzing the rate of change in the angular values. Additionally, by obtaining two measurement signals (e.g., two 90° phase shifted signals), a rotation direction of the rotatable target object may also be determined by the DSP 84. In general, two signals may be required to achieve a 360° unambiguous measurement range. For a system measuring in a limited range the property of the metamaterial must not necessarily be changed according to a sine/cosine system. For a limited range (e.g. +/−60°), a sine alone would be sufficient.

Figure 4:
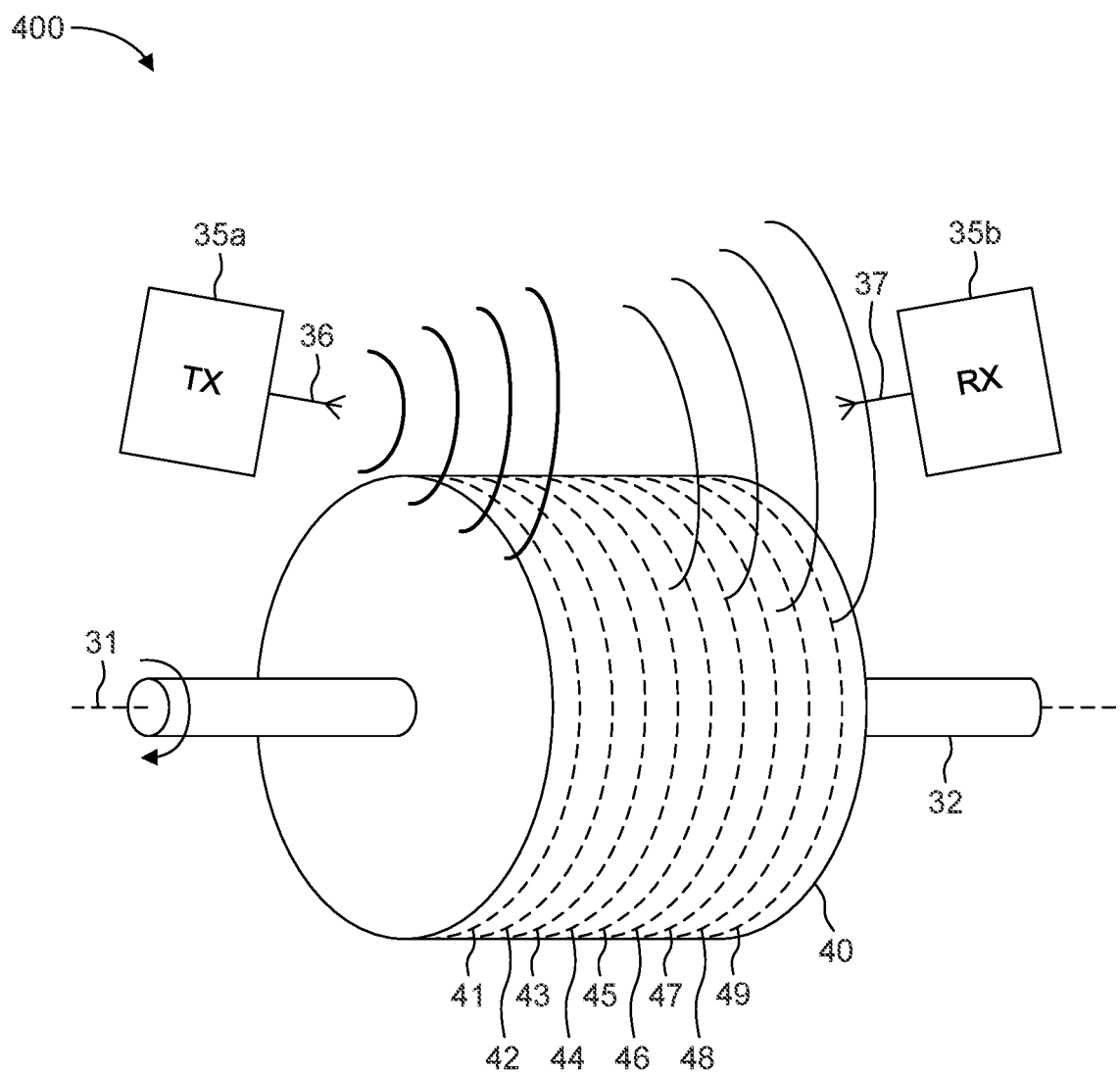
FIG. 4 is a schematic view of an angle sensor system according to one or more embodiments.

FIG. 4 is a schematic view of an angle sensor system 400 according to one or more embodiments. The angle sensor system 400 is similar to the angle sensor systems 300 and 301 depicted in FIGS. 3A and 3B, with the exception that the rotatable target object 40 is a cylinder and nine parallel metamaterial tracks 41-49 are disposed around the circumference of the cylinder. In this example, the transmitted mm-wave is targeted onto one of the tracks and a receiver antenna 37 receives the reflected signal. However, it will be appreciated that multiple transmitter antennas and multiple receiver antennas may be present for measuring the properties of the mm-waves that interact with each track.

Figure 5:
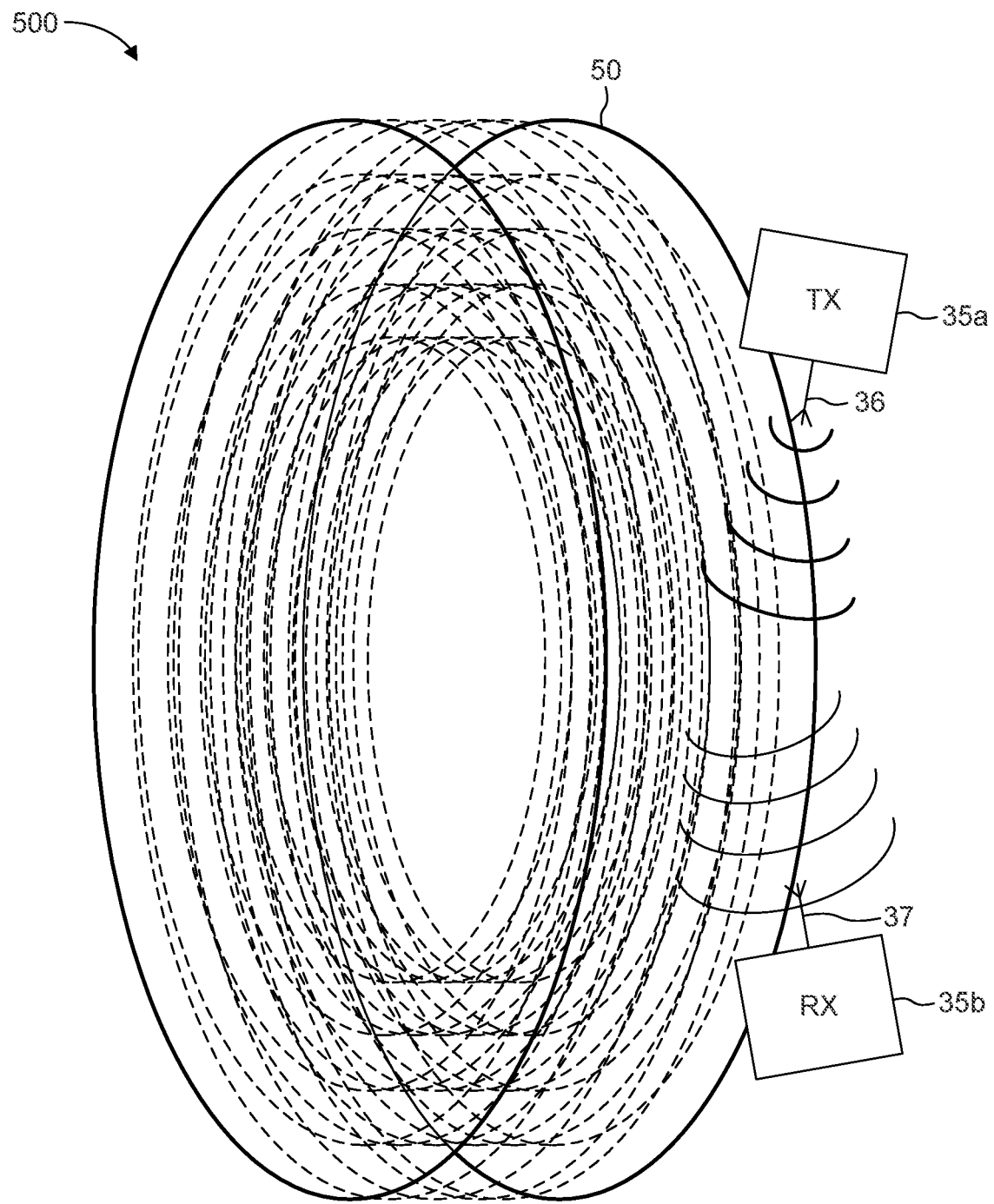
FIG. 5 is a schematic view of an angle sensor system according to one or more embodiments.

FIG. 5 is a schematic view of an angle sensor system 500 according to one or more embodiments. The angle sensor system 400 is similar to the angle sensor systems 300 and 301 depicted in FIGS. 3A and 3B, with the exception that the rotatable target object 50 is a ring with several layers of metamaterial tracks disposed around rotational axis of the ring. In particular, five layers of metamaterial tracks are shown, with each layer located at a different radial position or distance from the rotational axis. Each layer includes multiple parallel tracks at the same radial position or distance from the rotational axis.

In this example, the transmitted mm-wave is targeted onto one of the tracks and a receiver antenna 37 receives the reflected signal. However, it will be appreciated that multiple transmitter antennas and multiple receiver antennas may be present for measuring the properties of the mm-waves that interact with each track.

In summary, arrays of elementary structures are arranged on the surface (2D) or inside the volume (3D) of a rotatable target object that that is fixed on a rotational axis of which the rotational position is to be measured. The dots of the dotted lines in the drawings symbolize the array of elementary structures that are patterned along a closed-loop track. The structures or their arrangement in the array is varied around the rotational axis and changes at least one of the mm-wave properties of the arrangement dependent on the rotational angel of the actual position. The mm-wave property can be for example the reflectivity, the transitivity, the polarization, or the phase shift of the receive signal (i.e., the partially-reflected or the partially-transmitted wave). Typically, modifications by the metamaterial will affect multiple of those mm-wave parameters simultaneously.

The target may be rotational symmetric to the axis like a disc, a ring, cylinder, a sphere, or any other structure that rotates about a rotational axis and enables the metamaterial track to be formed in a closed loop. For example, the rotatable target object may be a wheel, a rim of a wheel, a gear, a shaft, etc.

A mm-wave is radiated onto the rotatable target object and is reflected at its surface or transmitted through it, and is received by a receiver. Depending on the frequency and the distance between the antenna, there can be a far field coupling or a near field coupling. Reflectivity and transmissivity measurements can be combined. The relation of the transmitted and received signals is evaluated with respect to the properties of the metamaterial that is modified dependent on the rotation angle. Since multiple of the meta material properties are changing simultaneously, also multiple mm-wave parameters of the received signals will depend on the rotational angle. Two or more mm-wave parameters of a same receive signal or of different receive signals may be evaluated simultaneously to discriminate the rotational position. Similarly, a single parameter of two or more receive signals may also be evaluated to discriminate the rotational position. Consequently, a measurement of all relevant variations can be used to improve the unambiguousness of the angle determination.

There are diverse possibilities for changing a metamaterial property according to a 360° periodical pattern. It will also be appreciated that a rotational segment of less than 360° may also be applicable. For example, applications that measure limited angle ranges (e.g. throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

The following different variations may be used to change the behavior of metamaterial along a rotation direction. Thus, FIGS. 6A-6G show different arrangements or patterns of elementary structures of a metamaterial according to one or more embodiments.

Figure 6A:
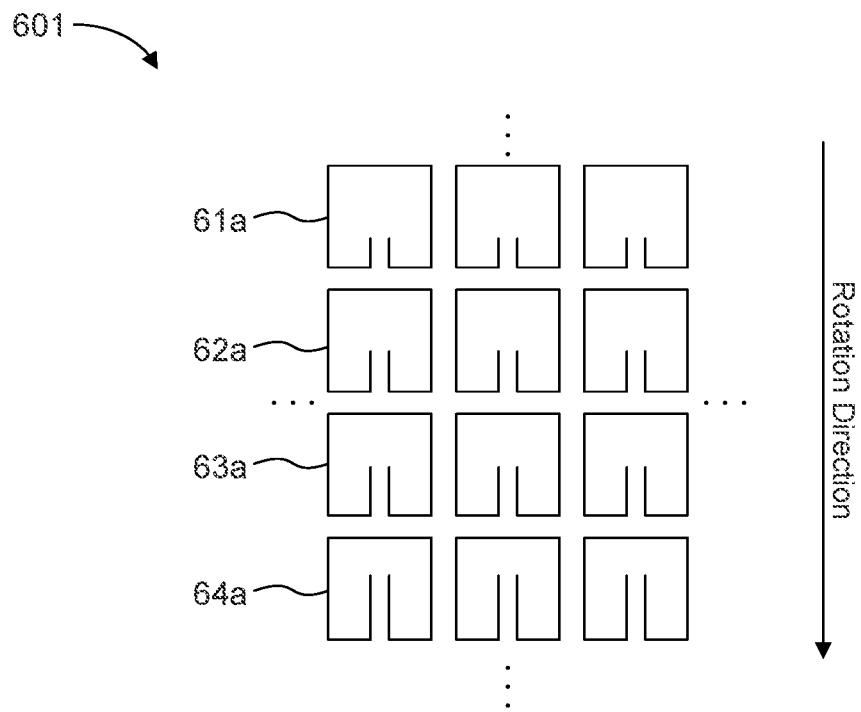
FIGS. 6A-6G show different arrangements or patterns of elementary structures of a metamaterial according to one or more embodiments.

FIG. 6A is a schematic diagram of an array of elementary structures 601 of a metamaterial track according to one or more embodiments. Here, the array includes multiple rows of split ring resonators 61a-64a in which the structures in each row have a same configuration and orientation. However, the structures in different rows have different configurations.

A 360° periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of the receive signal with respect to the transmit signal can be measured. Each phase shift value or amplitude value is specific to an absolute angular position (i.e., an angular value) of the rotatable target object.

Figure 6B:
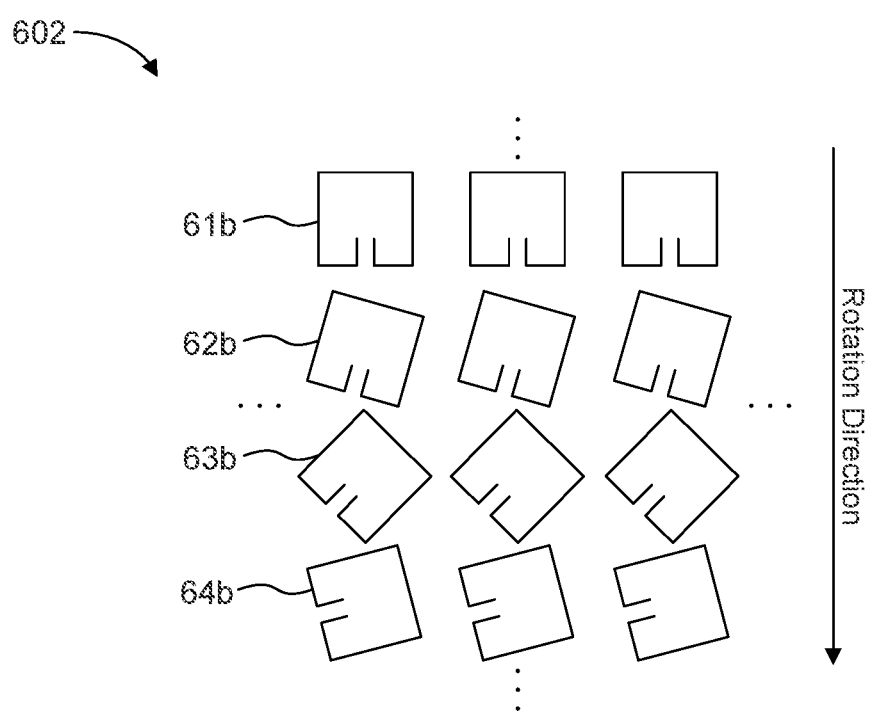

FIG. 6B is a schematic diagram of an array of elementary structures 602 of a metamaterial track according to one or more embodiments. Here, the array includes multiple rows of split ring resonators 61b-64b in which the structures in each row have a same configuration and orientation. However, the structures in different rows have different orientations.

Thus, on the surface of the target object, the split ring resonators 61b-64b are rotated or pivoted (e.g., clockwise or counterclockwise) incrementally in varying degrees along the rotation direction. As a result, the structures in each row have a different angled orientation with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 6C:
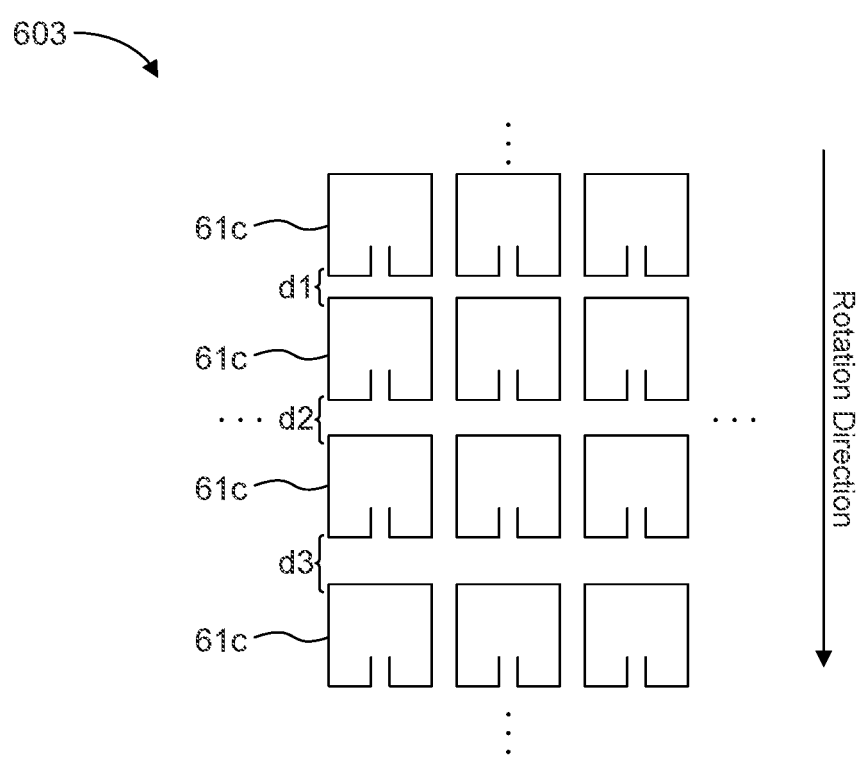

FIG. 6C is a schematic diagram of an array of elementary structures 603 of a metamaterial track according to one or more embodiments. Here, the array includes multiple rows of split ring resonators 61c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°.

Figure 6D:
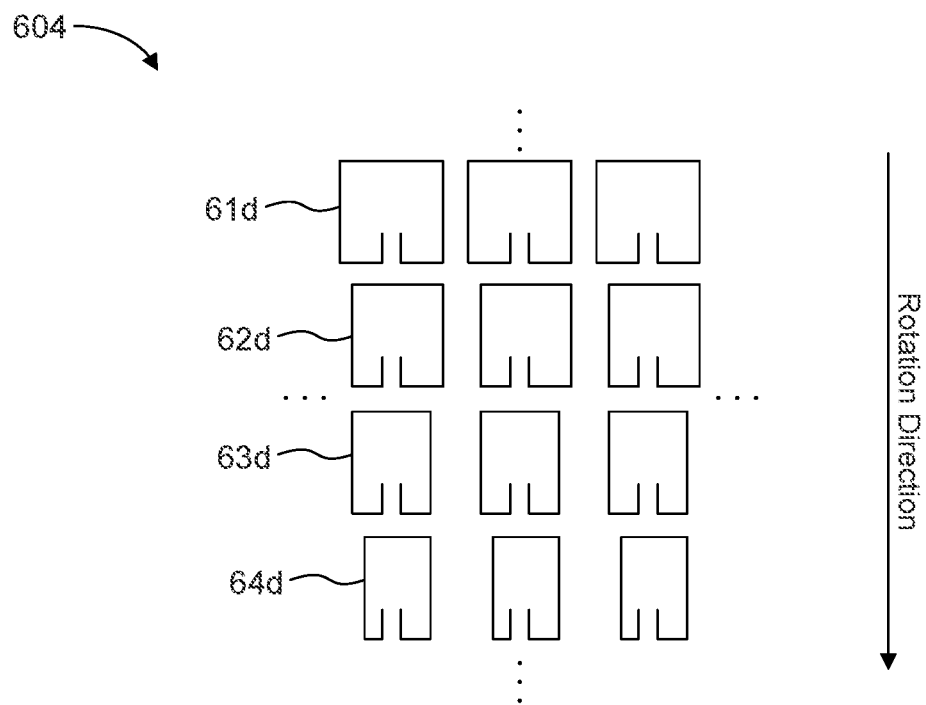

FIG. 6D is a schematic diagram of an array of elementary structures 604 of a metamaterial track according to one or more embodiments. Here, the array includes multiple rows of split ring resonators 61d-64d in which the structures in each row have a same configuration and orientation. However, the structures in different rows have different configurations.

In this case, an inductive coupling scaled by reducing or increasing the loop area in along the rotation direction. For example, the loop size of consecutive rows gradually changes along the rotation direction. Thus, the loop size of the split ring resonators 61d is larger than the loop size of the split ring resonators 62d, which is larger than the loop size of the split ring resonators 63d, and so on. This also results in a change in the spacing between structures in the direction perpendicular to the rotation direction, which may further change the capacitive coupling. This scales the inductive coupling and/or the capacitive coupling between structures in way that is periodical over 360°.

Figure 6E:
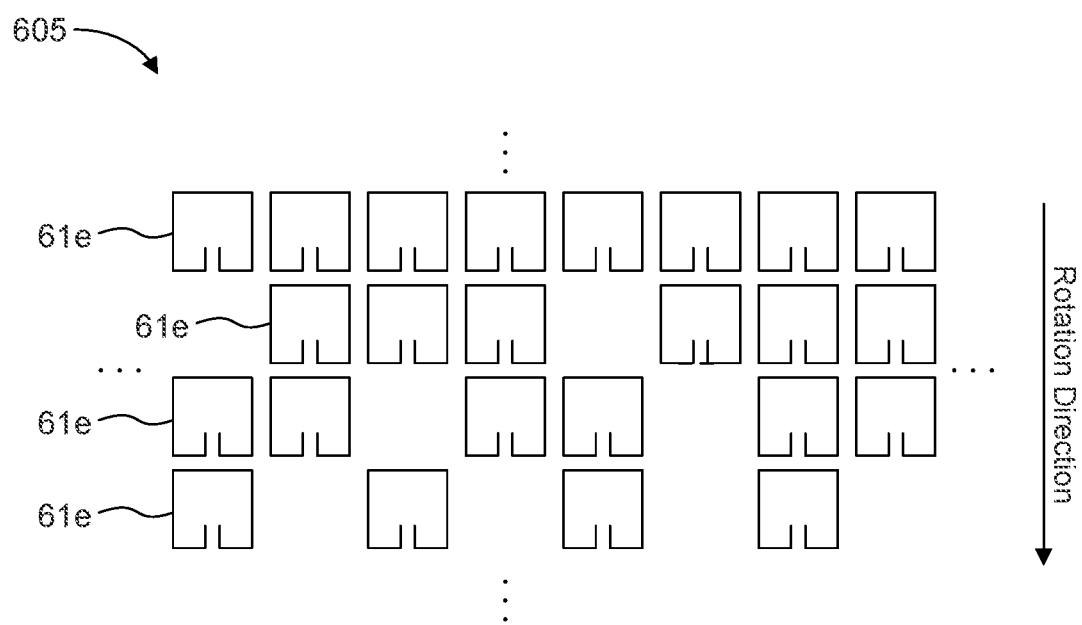

FIG. 6E is a schematic diagram of an array of elementary structures 605 of a metamaterial track according to one or more embodiments. Here, the array includes multiple rows of split ring resonators 61e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°.

Figure 6F:
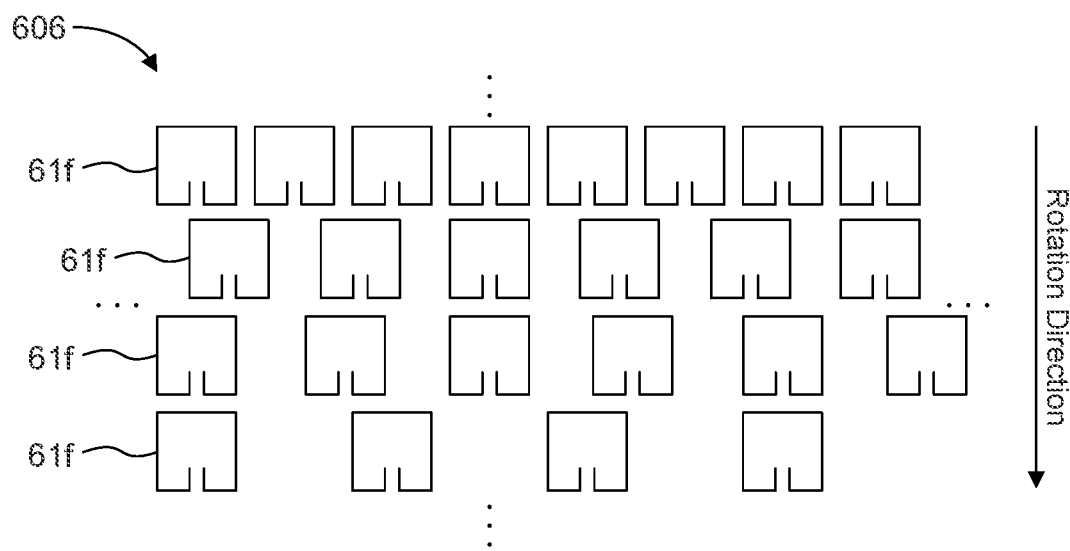

FIG. 6F is a schematic diagram of an array of elementary structures 606 of a metamaterial track according to one or more embodiments. Here, the array includes multiple rows of split ring resonators 61*f* in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 6G:
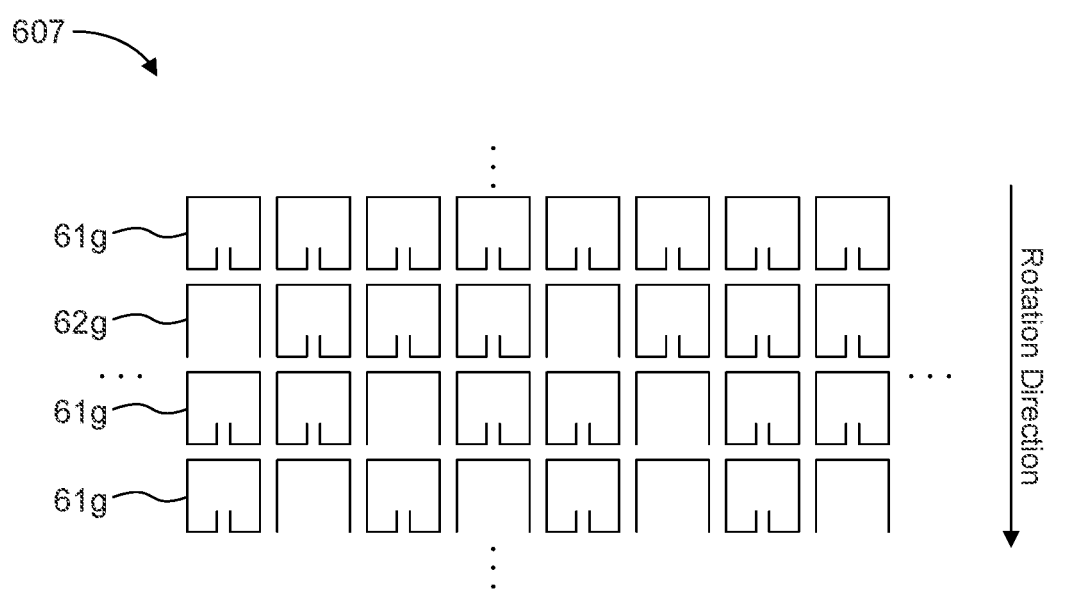

FIG. 6G is a schematic diagram of an array of elementary structures 607 of a metamaterial track according to one or more embodiments. Here, the array is a heterogeneous array of mixed different structures such that the structure types that populate the array is varied in different arrangements throughout the array. In this case, two different types of structures 61*g* and 62*g* are use in a pattern that gradually and continuously changes the inductive coupling and/or the capacitive coupling between structures in way that is periodical over 360°. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360° periodical pattern where the reflectivity and/or transmittivity is unique for each discrete angle.

Figure 7:
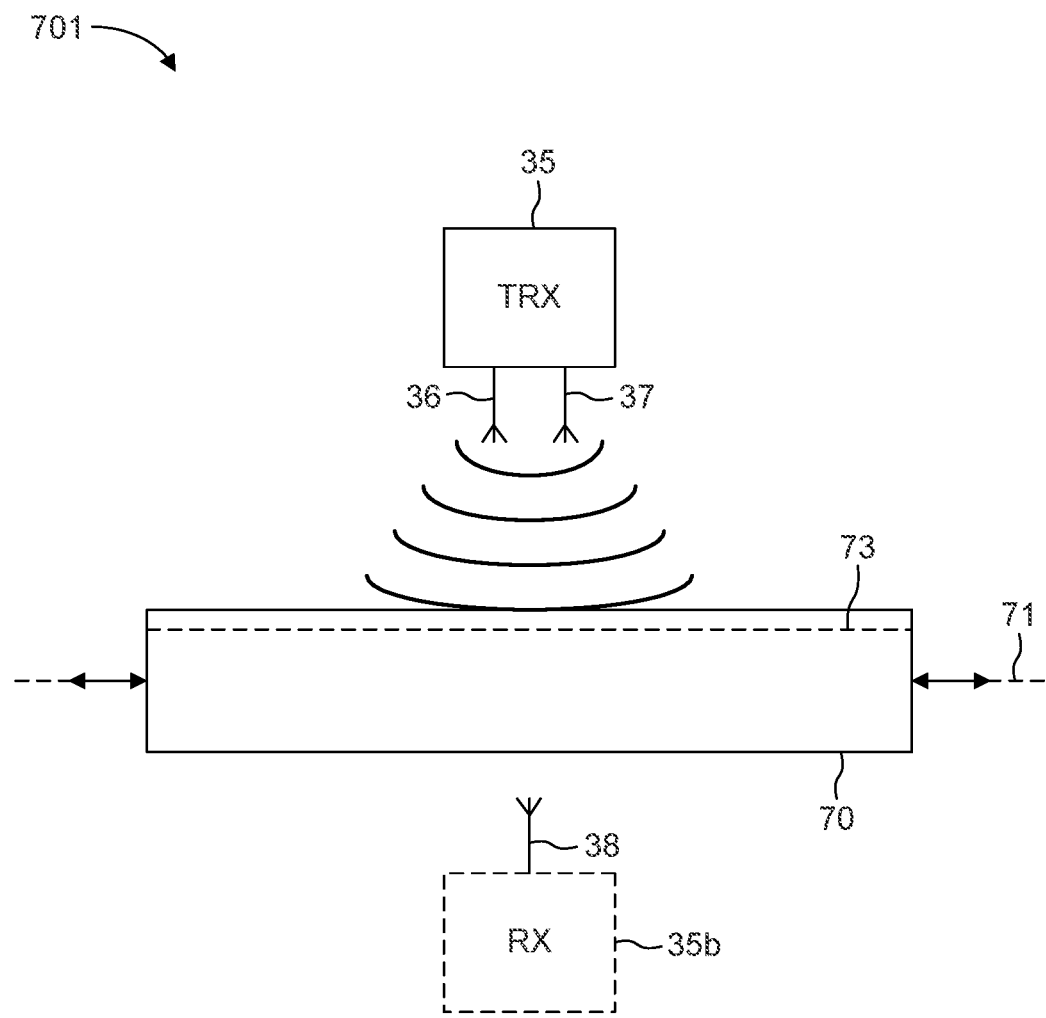
FIG. 7 illustrates a schematic view of a linear position sensor system 701 according to one or more embodiments.

Similar principles described above also apply to a linear position sensor system. In particular, FIG. 7 illustrates a schematic view of a linear position sensor system 701 according to one or more embodiments. In this case, a linear movable target object 70 configured to move linearly in a linear moving direction on a linear axis 71. A mm-wave metamaterial track 73 is coupled to the linear movable target object 70 such that the mm-wave metamaterial track 73 extends along the linear moving direction. In addition, the mm-wave metamaterial track 73 is made up of an array of elementary structures having at least one first characteristic that changes along the mm-wave metamaterial track in the linear moving direction, similar to the way the configuration of the array of elementary structures changes around the perimeter of the mm-wave metamaterial track in the previous examples related to rotational position sensing. Thus, the configuration of the array of elementary structures is unique to a linear position of the mm-wave metamaterial track on the linear movable target object 70.

The linear position sensor system 701 further includes at least one of a transceiver, transmitter, and/or receiver combination. For example, the linear position sensor system 701 may include a transceiver 35 having a transmitter antenna 36 configured to transmit an mm-wave (i.e., an electro-magnetic transmit signal) at the metamaterial track 73. The transceiver 35 also includes a receiver antenna 37 configured to receive a partially-reflected mm-wave (i.e., an electro-magnetic receive signal) from the metamaterial track 73.

Alternatively, the linear position sensor system 701 may include receiver 35*b* that includes receiver antenna 38 is configured to receive a partially transmitted mm-wave (i.e., an electro-magnetic receive signal) as a result of the transmitted mm-wave interacting with (i.e., being partially absorbed by and transmitted through) the metamaterial track 73.

The receiver either at the transceiver 35 or the receiver 35*b* is configured to receive the electro-magnetic receive signal and determine a linear position of the linear movable target object based on the received electro-magnetic signal. In particular, the mm-wave metamaterial track 73 is configured to modify the electro-magnetic transmit signal, thereby producing the electro-magnetic receive signal having a property unique to the linear position of the mm-wave metamaterial track at which the electro-magnetic transmit signal is incident, and at least one processor is configured to evaluate the property of the received electro-magnetic receive signal, and determine the linear position of the linear movable target object based on the evaluated property.

FIGS. 8A-8D are schematic views of various antenna configurations in an angle sensor system according to one or more embodiments. The antenna configurations may be used in any of the described embodiments, alone or in combination.

Figure 8A:
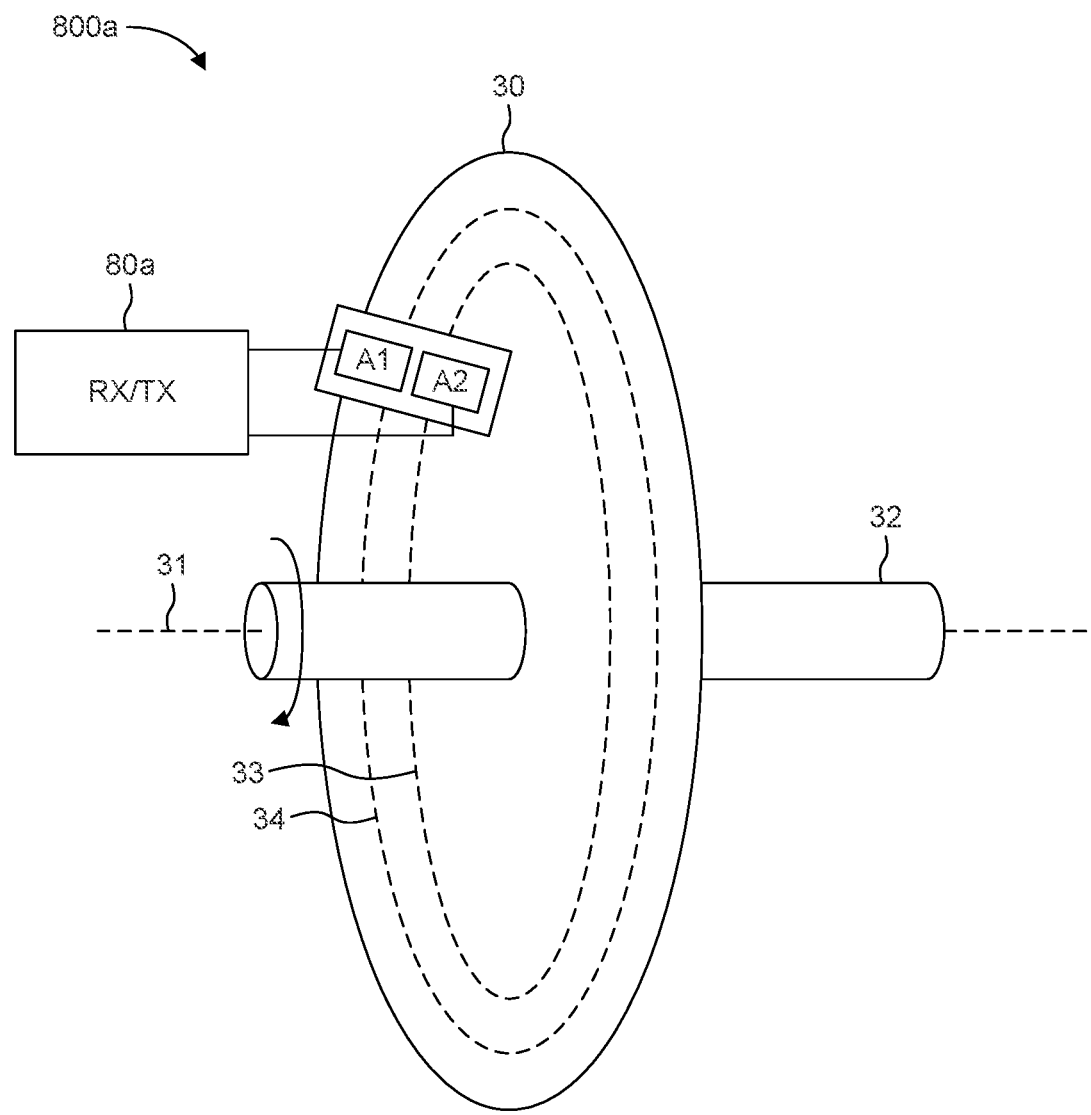
FIGS. 8A-8D are schematic views of various antenna configurations in an angle sensor system according to one or more embodiments.

In FIG. 8A, the angle sensor system 800*a* includes a transceiver 80*a* electrically coupled to two antennas A1 and A2 that are arranged in proximity to (i.e., coupled to via a coupling effect) a respective metamaterial track 33 and 34. In this case, each antenna A1 and A2 are configured to transmit a mm-wave beam and receive a reflected mm-wave beam from its respective metamaterial track to perform a measurement thereon. The transceiver 80*a* includes a directional coupler in order to perform transmission and reception via a same antenna.

Figure 8B:
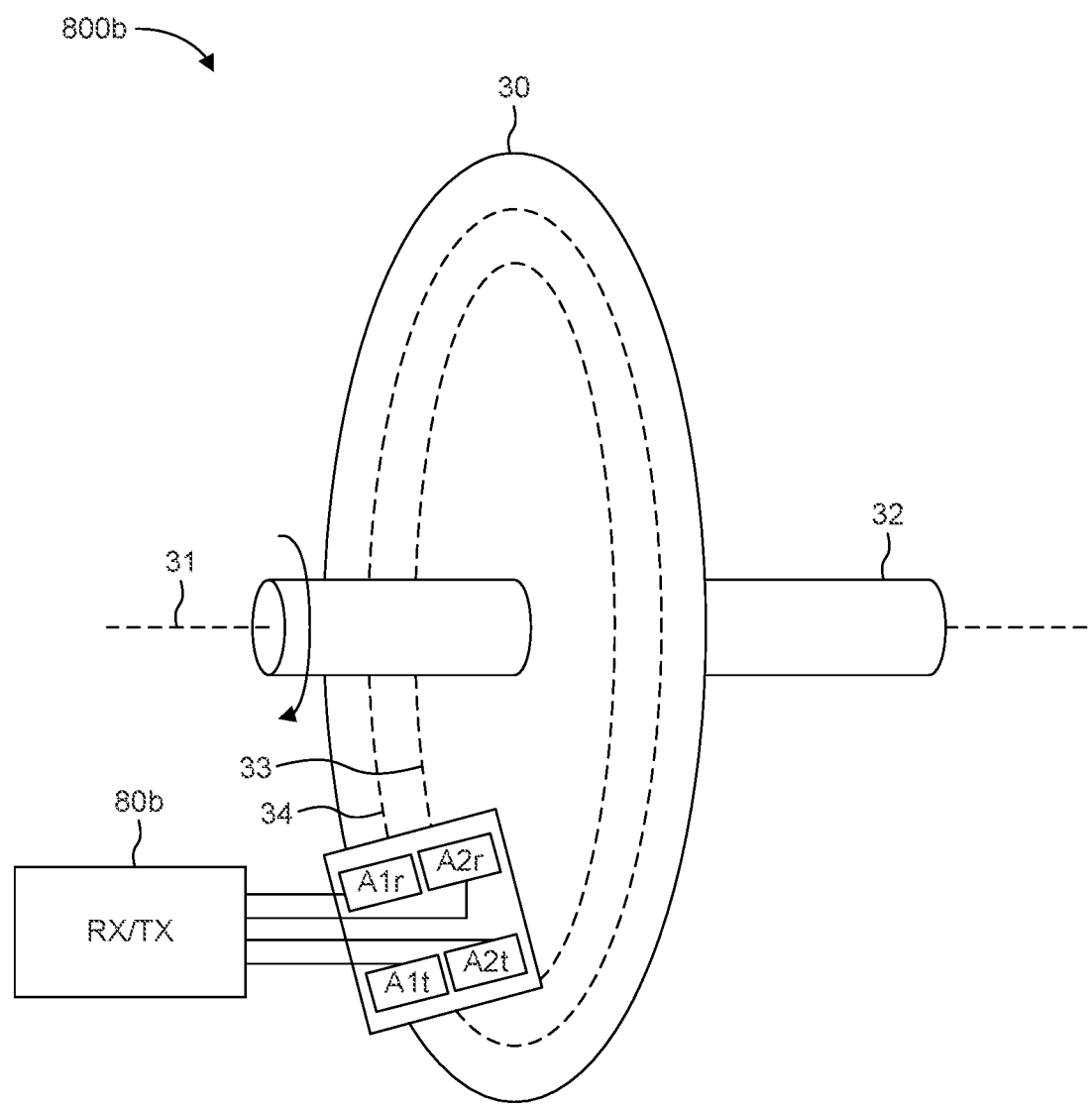

In FIG. 8B, the angle sensor system 800*b* includes a transceiver 80*b* electrically coupled to a pair of transmission antennas A1*t*-A2*t* and a pair of receiver A1*r*-A2*r* (i.e., four antennas in all). This arrangement is similar to the arrangement shown in FIG. 8A, except separate antennas are used for transmitting and receiving mm-waves.

Figure 8C:
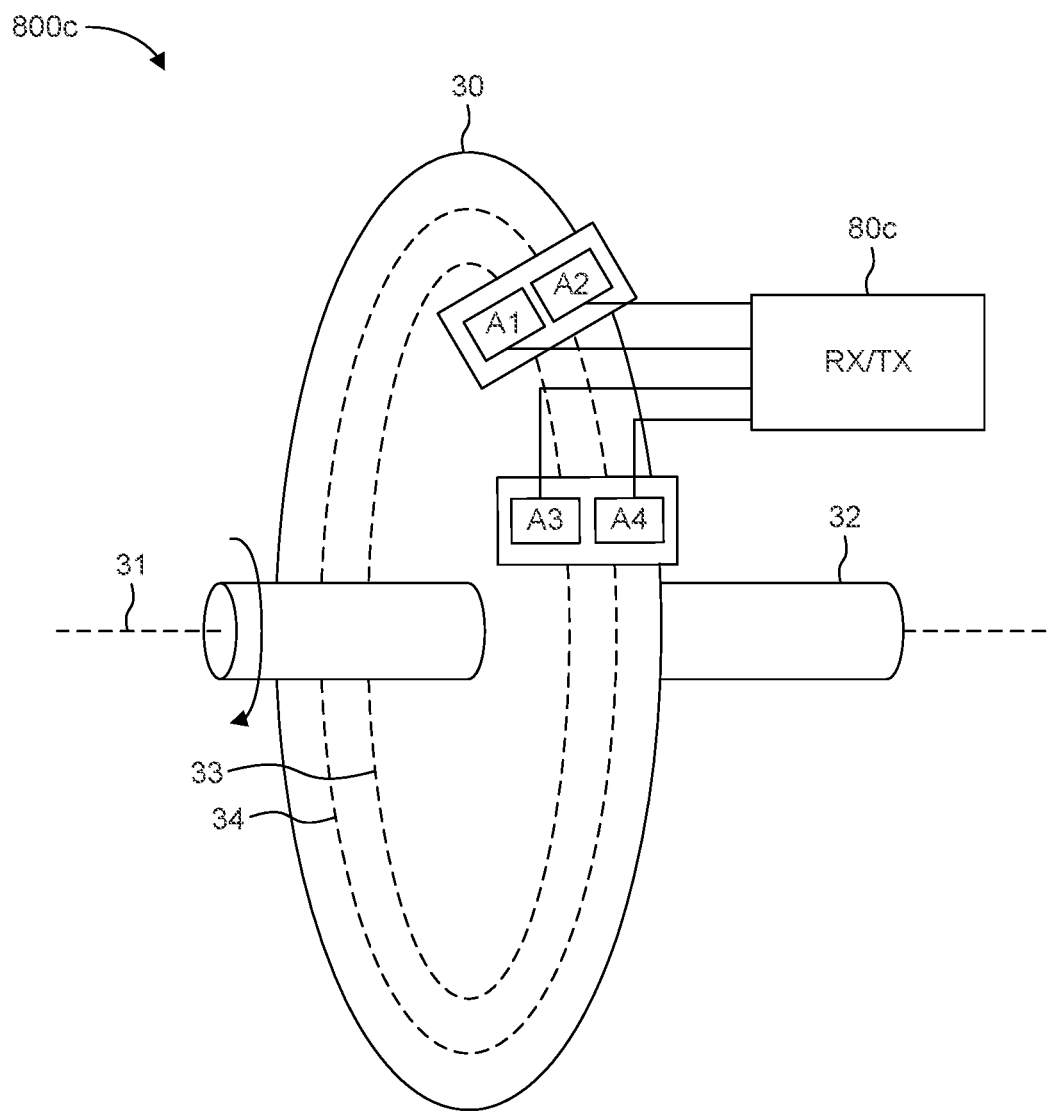

In FIG. 8C, the angle sensor system 800*c* includes a transceiver 80*c* electrically coupled to two pairs of antennas A1-A2 and A3-A4 (i.e., four antennas in all). Each antenna pair has one antenna arranged in proximity to (i.e., coupled to via a coupling effect) a respective metamaterial track 33 and 34. Thus, two antennas (e.g., A1-A3 and A2-A4) are coupled to each track. Antenna A1/A2 couple into their respective metamaterial track, which acts as a transmission line, and antennas A3/A4 couple the signal out again (at least partly).

As a result, antenna A1 transmits a signal into track 33, track 33 acts as a transmission line and transmits the signal along the track, where antenna A3 picks up (i.e., couples out) the transmitted signal having an altered property due to the transmission along the metamaterial track 33.

Similarly, antenna A2 transmits a signal into track 34, track 34 acts as a transmission line and transmits the signal along the track, where antenna A4 picks up (i.e., couples out)

the transmitted signal having an altered property due to the transmission along the metamaterial track 34.

Thus, the transmitted signal couples into the metamaterial track which acts as transmission line and in a larger distance (i.e., several elementary metamaterial structure sizes) a receive antenna extracts a part of the energy.

Figure 8D:
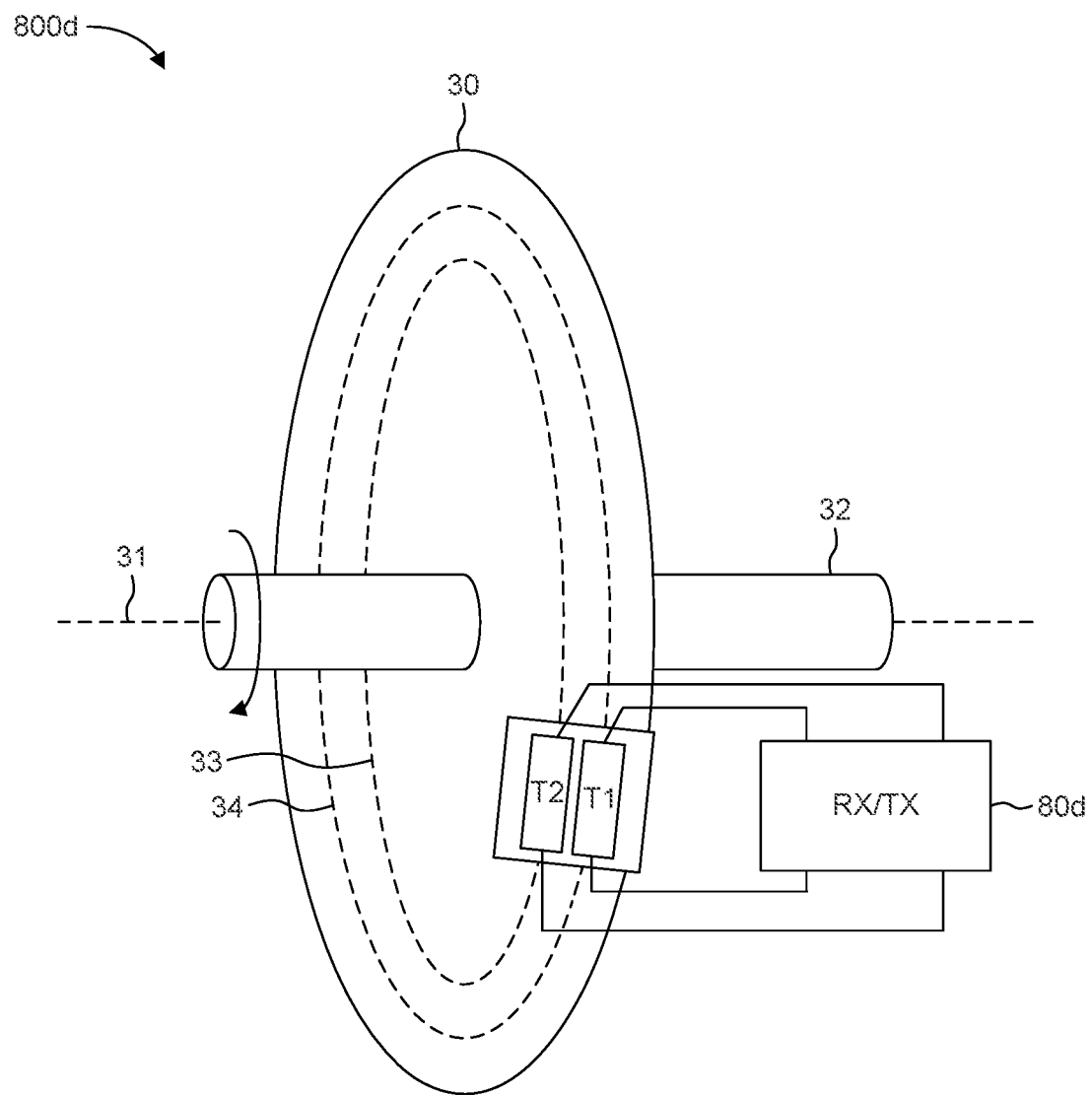

In FIG. 8D, the angle sensor system 800d includes a transceiver 80d electrically coupled to two transmission lines T1 and T2 that are each in proximity (i.e., coupled to via a coupling effect) a respective metamaterial track 33 and 34. The transmission lines T1 and T2 are substantially parallel with a segment of its respective track. Transmission lines T1 and T2 carry an electromagnetic wave from the transceiver 80d and the respective metamaterial track is in the region of the electromagnetic field surrounding the transmission line (e.g., a plastic fiber) and influences the mm-wave impedance of the transmission line or partly couples energy out before it reaches the other end of the transmission line. This influence is unique to the array of elementary structures that span along the transmission line, and changes according to the rotational position of the rotational object 30.

Further, while various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A rotation sensor system, comprising:
a rotatable target object configured to rotate about a rotational axis in a rotation direction;
a first millimeter-wave (mm-wave) metamaterial track coupled to the rotatable target object, wherein the first mm-wave metamaterial track is arranged around the rotational axis, and wherein the first mm-wave metamaterial track comprises a first array of elementary structures having at least one first characteristic that changes around a perimeter of the first mm-wave metamaterial track;
at least one transmitter configured to transmit a first electro-magnetic transmit signal towards the first mm-wave metamaterial track, wherein the first mm-wave metamaterial track converts the first electro-magnetic transmit signal into a first electro-magnetic receive signal;
at least one receiver configured to receive the first electro-magnetic receive signal; and
at least one processor configured to determine a rotational position of the rotatable target object based on the received first electro-magnetic receive signal.

2. The rotation sensor system of claim 1, wherein the at least one first characteristic affects an mm-wave property of the first mm-wave metamaterial track such that the mm-wave property of the first mm-wave metamaterial track changes continuously around the perimeter of the first mm-wave metamaterial track.

3. The rotation sensor system of claim 2, wherein the at least one first characteristic that changes around the perimeter of the first mm-wave metamaterial track causes at least one coupling effect between elementary structures of the first array of elementary structures to change continuously around the perimeter of the first mm-wave metamaterial track.

4. The rotation sensor system of claim 3, wherein the at least one coupling effect includes at least one of capacitive near field coupling, inductive near field coupling, waveguide coupling, or far field coupling.

5. The rotation sensor system of claim 1, wherein the first array of elementary structures has a 360°/N periodical pattern that changes continuously around the perimeter of the first mm-wave metamaterial track, where N is an integer.

6. The rotation sensor system of claim 1, wherein the rotational position of the rotatable target object is an absolute angular value of the rotatable target object about the rotational axis, the absolute angular value being an angle of rotation about the rotational axis in the range of 0° to 360°.

7. The rotation sensor system of claim 1, wherein the first mm-wave metamaterial track is configured to convert the first electro-magnetic transmit signal into the first receive signal by at least one of partial reflection or partial absorption, and the first electro-magnetic receive signal is either a partially-reflected signal of the first electro-magnetic transmit signal that is reflected by the first mm-wave metamaterial track or a partially-transmitted signal of the first electro-magnetic transmit signal that passes through the first mm-wave metamaterial track.

8. The rotation sensor system of claim 1, wherein:
the receiver is configured to demodulate the received first electro-magnetic receive signal to generate a demodulated signal, and
the at least one processor is configured to evaluate a property of the received first electro-magnetic receive signal using at least one of phase analysis, amplitude analysis, or spectral analysis, and determine the rotational position of the rotatable target object based on the evaluated property.

9. The rotation sensor system of claim 1, wherein:
the at least one transmitter is configured to transmit a second electro-magnetic transmit signal towards the first mm-wave metamaterial track, wherein the first mm-wave metamaterial track converts the second electro-magnetic transmit signal into a second electro-magnetic receive signal, and wherein the first electro-magnetic transmit signal interacts with the first mm-wave metamaterial track at a first angular position and the second electro-magnetic transmit signal interacts with the first mm-wave metamaterial track at a second angular position, wherein the first angular position and the second angular position are shifted from each other by a predetermined amount, and
the at least one receiver is configured to receive the second electro-magnetic receive signal, and determine the rotational position of the rotatable target object based on the first electro-magnetic receive signal and the second electro-magnetic receive signal.

10. The rotation sensor system of claim 9, wherein the at least one processor is configured to determine a rotation direction of the rotatable target object based on the received first electro-magnetic receive signal and the received second electro-magnetic receive signal.

11. The rotation sensor system of claim 10, wherein the first array of elementary structures has a 360°/N periodical pattern that changes continuously around the perimeter of the first mm-wave metamaterial track, where N is an integer, and the first angular position and the second angular position are located 90° apart along the 360°/N periodical pattern such that the first receive signal and the second receive signal have a 90° phase difference.

12. The rotation sensor system of claim 1, further comprising:
a second mm-wave metamaterial track coupled to the rotatable target object, wherein the second mm-wave metamaterial track is arranged around the rotational axis, and wherein the second mm-wave metamaterial track comprises a second array of elementary structures having at least one second characteristic that changes around a perimeter of the second mm-wave metamaterial track,
wherein the at least one transmitter is configured to transmit the first electro-magnetic transmit signal at the second mm-wave metamaterial track, wherein the second mm-wave metamaterial track converts the first electro-magnetic transmit signal into a second electro-magnetic receive signal,
the at least one receiver is configured to receive the second electro-magnetic receive signal, and
the at least one processor is configured to determine the rotational position of the rotatable target object based on the first electro-magnetic receive signal and the second electro-magnetic receive signal.

13. The rotation sensor system of claim 12, wherein:
the first mm-wave metamaterial track is configured to modify the first electro-magnetic transmit signal, thereby producing the first electro-magnetic receive signal having a first property unique to a first angular position of the first mm-wave metamaterial track at which the first electro-magnetic transmit signal is incident,
the first mm-wave metamaterial track is configured to modify the second electro-magnetic transmit signal, thereby producing the second electro-magnetic receive signal having a second property unique to a second angular position of the first mm-wave metamaterial track at which the second electro-magnetic transmit signal is incident, and
the at least one processor is configured to evaluate the first property of the received first electro-magnetic receive signal and the second property of the received second electro-magnetic receive signal, and determine the rotational position of the rotatable target object based on the evaluated first property and the evaluated second property.

14. The rotation sensor system of claim 1, further comprising:
a second mm-wave metamaterial track coupled to the rotatable target object, wherein the second mm-wave metamaterial track is arranged around the rotational axis, and wherein the second mm-wave metamaterial track comprises a second array of elementary structures having at least one second characteristic that changes around a perimeter of the second mm-wave metamaterial track,
wherein the at least one transmitter is configured to transmit a second electro-magnetic transmit signal at the second mm-wave metamaterial track, wherein the second mm-wave metamaterial track converts the second electro-magnetic transmit signal into a second electro-magnetic receive signal,
the at least one receiver is configured to receive the second electro-magnetic receive signal, and
the at least one processor is configured to determine the rotational position of the rotatable target object based on the first electro-magnetic receive signal and the second electro-magnetic receive signal.

15. The rotation sensor system of claim 14, wherein:
the first mm-wave metamaterial track is configured to modify the first electro-magnetic transmit signal, thereby producing the first electro-magnetic receive signal having a first property unique to a first angular position of the first mm-wave metamaterial track at which the first electro-magnetic transmit signal is incident,
the second mm-wave metamaterial track is configured to modify the second electro-magnetic transmit signal, thereby producing the second electro-magnetic receive signal having a second property unique to a second angular position of the second mm-wave metamaterial track at which the second electro-magnetic transmit signal is incident, and
the at least one processor is configured to evaluate the first property of the received first electro-magnetic receive signal and the second property of the received second electro-magnetic receive signal, and determine the rotational position of the rotatable target object based on the evaluated first property and the evaluated second property.

16. The rotation sensor system of claim 14, wherein:
the first array of elementary structures has a 360°/N periodical pattern that changes continuously around the perimeter of the first mm-wave metamaterial track, wherein N is an integer,
the second array of elementary structures has the 360°/N periodical pattern that changes continuously around the perimeter of the second mm-wave metamaterial track, and
the 360°/N periodical pattern of the second array of elementary structures is rotated 90° about the rotational axis with respect to the 360°/N periodical pattern of the first array of elementary structures such that the first electro-magnetic receive signal and the second electro-magnetic receive signal have a 90° phase difference.

17. The rotation sensor system of claim 16, wherein the at least one processor is configured to determine a rotation direction of the rotatable target object based on the received first electro-magnetic receive signal and the received second electro-magnetic receive signal.

18. The rotation sensor system of claim 1, wherein:
the at least one first characteristic of the first array of elementary structures includes at least one of a configuration or an orientation of elementary structures of the first array of elementary structures,
the configuration includes at least one of a size a shape, a spacing, a density, or a type of the of the elementary structures, and
the orientation includes a rotation of the elementary structures with respect to a polarization of the transmit signal.

19. The rotation sensor system of claim 1, further comprising:
a shaft coupled to the rotatable target object, the shaft extending along the rotational axis,
wherein the first mm-wave metamaterial track forms a closed loop around the shaft.

20. The rotation sensor system of claim 1, wherein:
the first mm-wave metamaterial track is configured to modify the first electro-magnetic transmit signal, thereby producing the first electro-magnetic receive signal having a first property unique to a first angular position of the first mm-wave metamaterial track at which the first electro-magnetic transmit signal is incident, and
the at least one processor is configured to evaluate the first property of the received first electro-magnetic receive signal, and determine the rotational position of the rotatable target object based on the evaluated first property.

21. The rotation sensor system of claim 1, wherein first electro-magnetic transmit signal and the first electro-magnetic receive signal are wireless electro-magnetic signals.

22. The rotation sensor system of claim 1, wherein the first mm-wave metamaterial track is configured to co-rotate with the rotatable target object as it rotates about the rotational axis.

23. A method of determining a rotational position of a rotatable target object, the method comprising:
transmitting a first electro-magnetic transmit signal towards a first millimeter-wave (mm-wave) metamaterial track coupled to the rotatable target object, wherein the first mm-wave metamaterial track is arranged around a rotational axis about which the rotatable target object rotates;
converting, by the first mm-wave metamaterial track, the first electro-magnetic transmit signal into a first electro-magnetic receive signal;
receiving the first electro-magnetic receive signal; and
evaluating the received first electro-magnetic receive signal; and
determining a rotational position of the rotatable target object based on the evaluated first electro-magnetic receive signal.

24. The method of claim 23, wherein:
the first electro-magnetic receive signal has a first property depending on an angular position of the rotatable target object,
evaluating the received first electro-magnetic receive signal comprises evaluating the first property of the received first electro-magnetic receive signal, and
determining the rotational position of the rotatable target object comprises determining the rotational position of the rotatable target object based on the evaluated first property.

25. The method of claim 23, further comprising:
transmitting a second electro-magnetic transmit signal at the first mm-wave metamaterial track;
converting, by the first mm-wave metamaterial track, the second electro-magnetic transmit signal into a second electro-magnetic receive signal;
receiving the second electro-magnetic receive signal;
evaluating the received second electro-magnetic receive signal; and
determining the rotational position of the rotatable target object based on the evaluated first electro-magnetic receive signal and the evaluated second electro-magnetic receive signal.

26. The method of claim 25, further comprising:
determining a rotation direction of the rotatable target object based on the received first electro-magnetic receive signal and the received electro-magnetic second receive signal, wherein the first electro-magnetic transmit signal interacts with a first angular position of the first mm-wave metamaterial track and the second electro-magnetic transmit signal interacts with a second angular position of the first mm-wave metamaterial track, wherein the first angular position and the second angular position are shifted from each other by a predetermined amount.

27. The method of claim 23, further comprising:
transmitting the first electro-magnetic transmit signal at a second mm-wave metamaterial track coupled to the rotatable target object, wherein the second mm-wave metamaterial track is arranged around the rotational axis about which the rotatable target object rotates;
converting, by the second mm-wave metamaterial track, the first electro-magnetic transmit signal into a second electro-magnetic receive signal;
receiving the second electro-magnetic receive signal;
evaluating the received second electro-magnetic receive signal; and
determining the rotational position of the rotatable target object based on the evaluated first electro-magnetic receive signal and the evaluated second electro-magnetic receive signal.

28. The method of claim 27, further comprising:
determining a rotation direction of the rotatable target object based on the received first electro-magnetic receive signal and the received second electro-magnetic receive signal.

29. The method of claim 23, further comprising:
transmitting a second electro-magnetic transmit signal at a second mm-wave metamaterial track coupled to the rotatable target object, wherein the second mm-wave metamaterial track is arranged around the rotational axis about which the rotatable target object rotates;
converting, by the second mm-wave metamaterial track, the second electro-magnetic transmit signal into a second electro-magnetic receive signal;
receiving the second electro-magnetic receive signal;
evaluating the received second electro-magnetic receive signal; and
determining the rotational position of the rotatable target object based on the first electro-magnetic receive signal and the evaluated second electro-magnetic receive signal.

30. The method of claim 29, further comprising:
determining a rotation direction of the rotatable target object based on the received first electro-magnetic receive signal and the received second electro-magnetic receive signal.

31. A linear position sensor system, comprising:
a linear movable target object configured to move linearly in a linear moving direction;
a millimeter-wave (mm-wave) metamaterial track coupled to the linear movable target object, wherein the mm-wave metamaterial track extends along the linear moving direction, and wherein the mm-wave metamaterial track comprises an array of elementary structures having at least one first characteristic that changes along the mm-wave metamaterial track in the linear moving direction;
at least one transmitter configured to transmit an electro-magnetic transmit signal towards the mm-wave metamaterial track, wherein the mm-wave metamaterial track converts the electro-magnetic transmit signal into an electro-magnetic receive signal;
at least one receiver configured to receive the electro-magnetic receive signal; and
at least one processor configured to determine a linear position of the linear movable target object based on the received electro-magnetic signal.

32. The linear position sensor system of claim 31, wherein:
the mm-wave metamaterial track is configured to modify the electro-magnetic transmit signal, thereby producing the electro-magnetic receive signal having a property unique to the linear position of the mm-wave metamaterial track at which
the electro-magnetic transmit signal is incident, and the at least one processor is configured to evaluate the property of the received electro-magnetic receive signal, and determine the linear position of the linear movable target object based on the evaluated property.

33. The linear position sensor system of claim 32, wherein the mm-wave metamaterial track extends parallel to the linear moving direction, and the at least one first characteristic changes continuously along the mm-wave metamaterial track in parallel to the linear moving direction such that each point of incidence on the mm-wave metamaterial track has a unique value for the at least one first characteristic.

34. The linear position sensor system of claim 31, wherein:
the linear movable target object is configured to move linearly in the linear moving direction on a fixed path, and
the at least one transmitter and the at least one receiver are movably fixed such that the linear movable target object and the mm-wave metamaterial track move relative to the at least one transmitter and the at least one receiver.

35. The linear position sensor system of claim 34, wherein the determined linear position is an absolute position of the linear movable target object on the fixed path.

* * * * *